Feb. 12, 1963 LE ROY G. SCHLICHT 3,077,517

TRANSISTORIZED TELEVISION CAMERA

Filed Aug. 5, 1960 5 Sheets-Sheet 1

INVENTOR:
Leroy G. Schlicht
By Smyth, Roston & Pavitt
Attorneys.

Fig. 3 (Video Amplifier Circuit)

INVENTOR:
Leroy G. Schlicht
By Smyth, Roston & Pavitt
Attorneys.

INVENTOR:
Leroy G. Schlicht
By Smyth, Roston & Pavitt
Attorneys.

INVENTOR:
Leroy G. Schlicht
By Smyth, Roston & Pavitt
Attorneys.

INVENTOR:
Leroy G. Schlicht
By Smyth, Roston & Pavitt
Attorneys.

United States Patent Office 3,077,517
Patented Feb. 12, 1963

3,077,517

TRANSISTORIZED TELEVISION CAMERA

Le Roy G. Schlicht, Anaheim, Calif., assignor to Packard-Bell Electronics Corporation, Los Angeles, Calif., a corporation of California Filed Aug. 5, 1960, Ser. No. 47,735
14 Claims. (Cl. 178—7.2)

This invention relates to television systems and, more particularly, to an economical, compact and efficient television camera for use essentially in closed television systems.

Television systems are unique in electrical communication in that they extend the range of vision of an observer. This characteristic leads to a wide range of applications in telemetering and monitoring of operations which take place in remote locations. For example, a single guard may simultaneously monitor or watch a number of remote positions. Such systems are generally referred to as closed systems because the cameras are connected to the viewing equipment by cable or wire facilities.

Closed systems have utility in many applications but the extended use of the systems have been limited by their cost. The major cost of the television system is the cost of the camera which is generally many times more expensive than the monitor or receiver. In a specific illustrative embodiment of this invention, a relatively inexpensive but high quality television camera is provided utilizing transistor circuitry. When transistor circuitry is employed, the usual advantages of transistors are achieved with regard to size and power requirements, but the utilization of transistors introduces a number of problems. For example, due to the relatively low interelectrode transistor impedances, transistor circuitry even of the emitter-follow type generally utilized for isolation, is inefficient for receiving television signals from a Vidicon or other picture tube.

In the specific illustrative embodiment of this invention, a double feedback loop is utilized in conjunction with a transistor emitter follower to provide a high impedance at the output of the Vidicon tube. A very high impedance load impedance is utilized for the Vidicon tube so that a long time constant is provided for changing the signal level. In prior systems, a complicated arrangement including sampling means, rectifiers and filters are used to slow down the signal level variation so that different light level scenes may be viewed in succession without delay. The utilization of a single load resistor for this function effects a considerable economy.

Other features of this invention relate to the provision of means for maintaining the linearity of the vertical sweep signals with variations in magnitude so that a linearity control is unnecessary. The horizontal and vertical sweep signals are provided respectively to two control transistors connected in parallel which perform a number of functions: The control transistors function as protective means because in the event of a sweep failure, either horizontal or vertical, the transistors blank the Vidicon beam to protect the Vidicon; the control transistors provide for retrace blanking; and the control transistors are part of circuit means for producing synchronization signals for transmission to a monitor or receiver for viewing the television signals.

Further features of this invention pertain to the utilization of a combination of vacuum tube and transistor circuitry to effect the advantages of each. For example, the oscillator or multivibrator for generating the horizontal frequency signals is a vacuum tube circuit and is designed to have a warmup time comparable to or larger than that of the Vidicon tube. During warmup of the horizontal multivibrator, the control transistors blank the Vidicon tube. The horizontal multivibrator, accordingly, cooperates with the control transistors to protect the Vidicon tube. As another illustration, a vacuum tube amplifier is utilized at the output end of the transistor video amplifier chain. The video signals may be taken directly from the video chain to a monitor, and the impedance isolation is desirable to prevent transistor burn-out due to differences in potential between the monitor and the camera.

Further advantages and features of this invention will become apparent upon consideration of the following description when read in conjunction with the drawing wherein.

Figure 1:
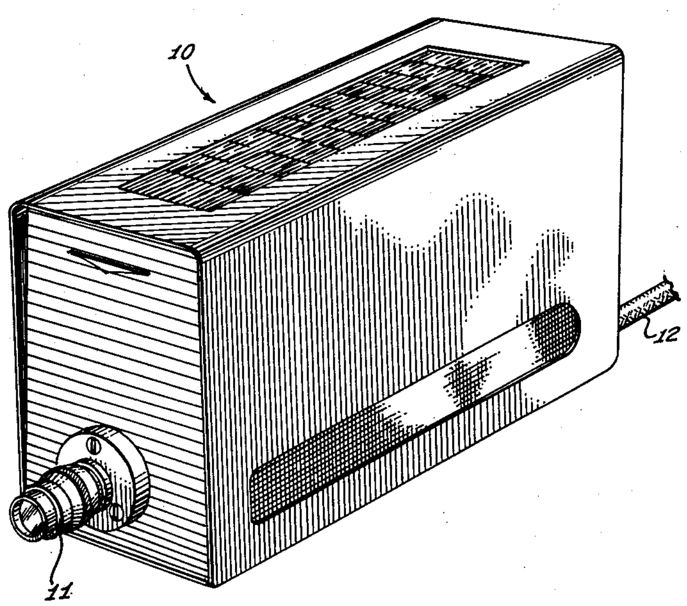
FIGURE 1 is a perspective view of the television camera of this invention.
Figure 2:
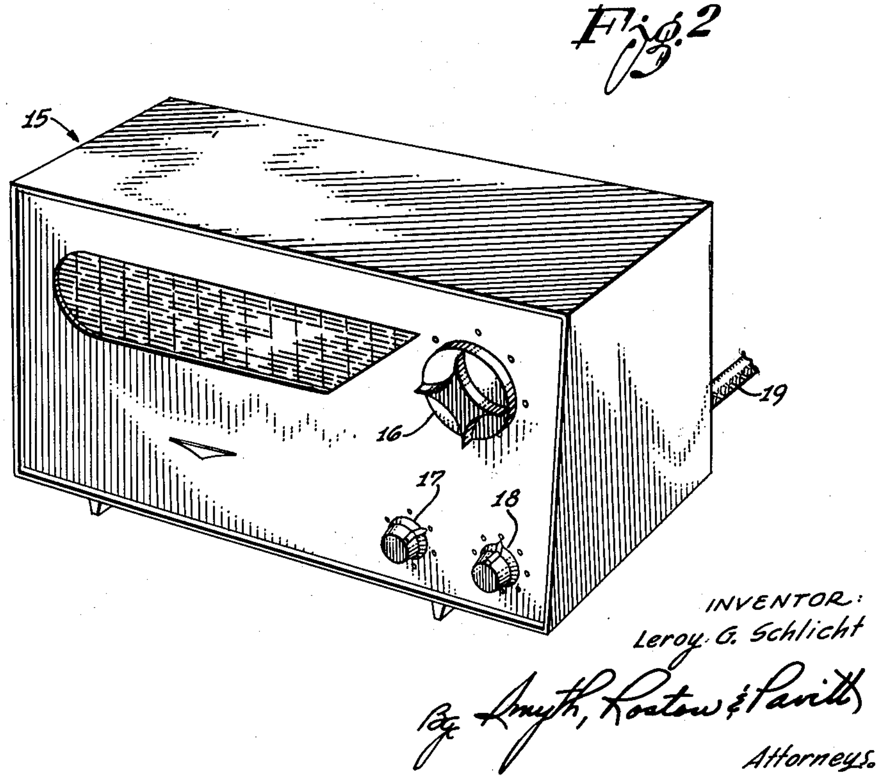
FIGURE 2 is a perspective view of a remote control unit associated with the television camera.

Referring first to FIGURE 1, a television camera 10 is depicted having a lens 11 which may be, illustratively, a 25 mm.-$f/1.9$ lens for viewing an area to be televised. The camera 10 does not include any control knobs as the control functions are provided by a camera control unit 15 depicted in FIGURE 2. The television camera 10 is coupled by a cable 12 to a cable 19 extending from the control unit 15. The control unit 15 includes three control knobs 16, 17 and 18. The control knob 16 functions as an on-off control for the unit 15 and for the camera 10, and also to adjust the brightness of the television image provided by the camera 10. The knob 17 is utilized to focus the television image, and the control knob 18 is utilized to adjust the contrast of the video image provided by the camera 10.

Figure 4:
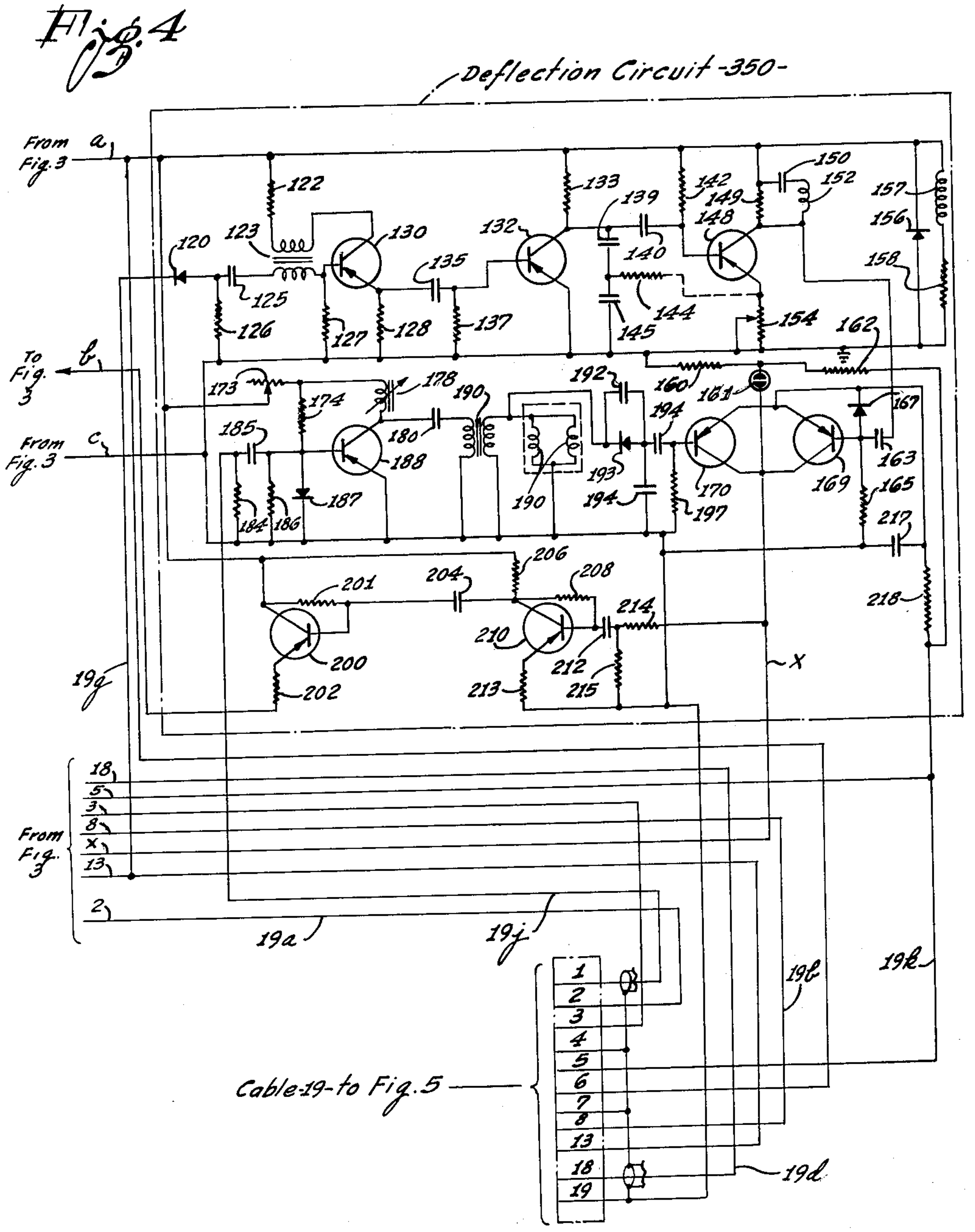
FIGURE 4 is a circuit representation of the deflection chassis of the television camera of this invention.
Figure 5:
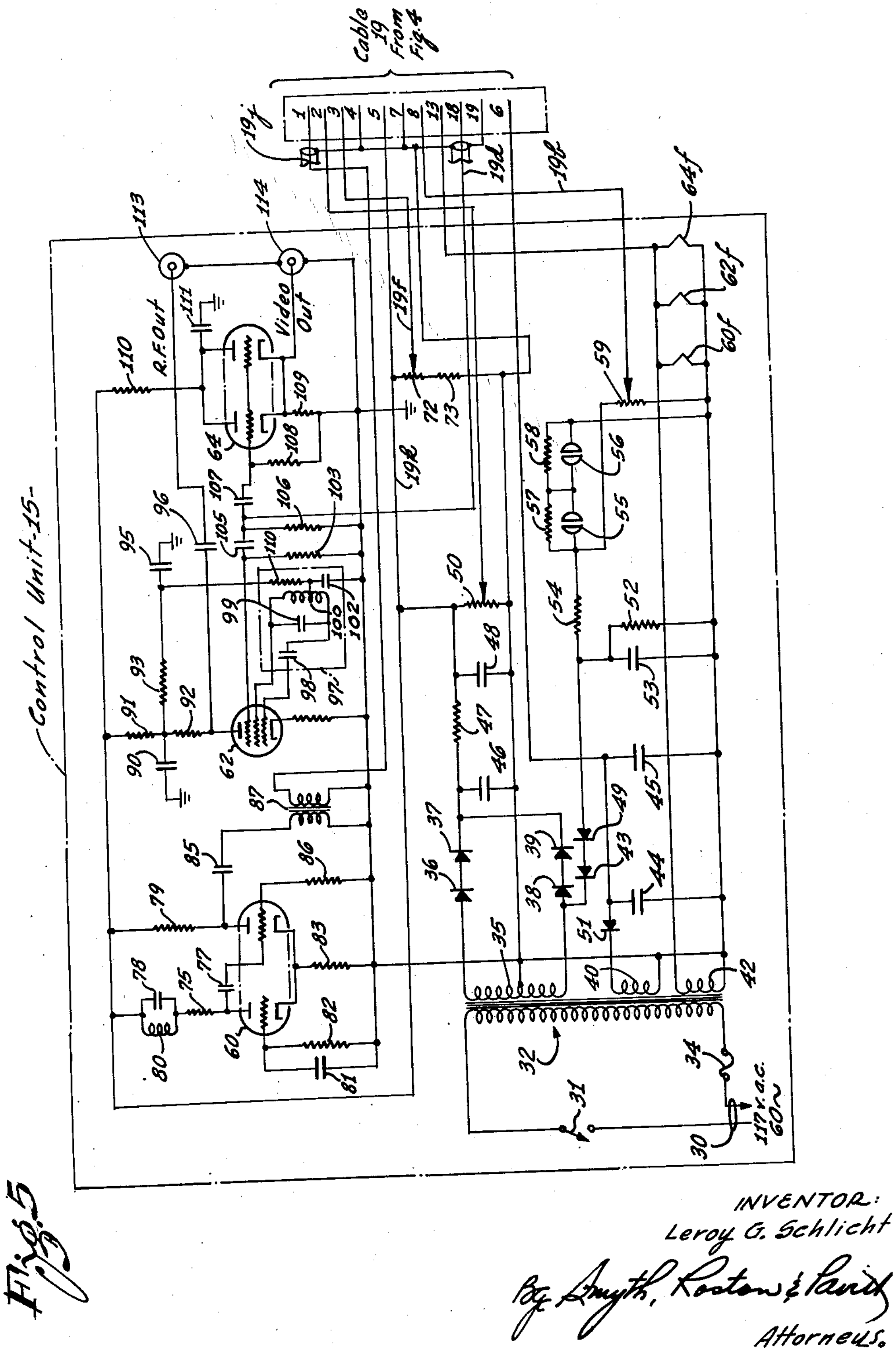
FIGURE 5 is a circuit representation of the camera control unit associated with the television camera of this invention.

When the knob 16 is rotated, it closes a switch 31, shown in the circuit representation of the control unit 15 in FIGURE 5, to introduce power from the leads 30 to a transformer 32. One of the input leads 30 is coupled through a fuse 34, which may have a rating of 2 amperes, to the transformer 32. The alternating current signal across the secondary 35 of the transformer 32 is rectified by four diodes 36–39 coupled serially in pairs to provide for sufficient peak inverse voltage rating. The diodes 36–39 are coupled to a filter arrangement including two capacitors 46 and 48 and a resistor 47. The capacitors 46 and 48 may have suitable values such as 40 microfarads and the resistor 47 a suitable value such as 5 kilohms. The filtered signal is provided across a potentiometer 50 which is controlled by the knob 17 at the front of the camera control unit 15 in FIGURE 2. The potential from the adjustable tap of the potentiometer 50 is provided through a lead 19*a* of a cable to a resistor 220 in FIGURE 3 at the output of the Vidicon tube 25. The voltage provided from the potentiometer 50 may be from 0 to +280 volts. The circuits shown in FIGURES 3 and 4 represent portions of the television camera 10 shown in FIGURE 1.

A negative supply voltage of 280 volts is produced by the serially connected diodes 43 and 49 which are coupled to one terminal of the secondary winding 35. The negative voltage through the diodes 43 and 49 is introduced across a filter capacitor 53 shunted by a resistor 52. The capacitor 53 may have a value of 40 microfarads and the resistor 52 may have a value of 120 kilohms. The filtered negative potential is provided through a resistor 54 to two serially connected neon lamps 55 and 56 shunted respectively by resistors 57 and 58. The resistors 54, 57 and 58 may have suitable values such as 270 kilohms, 180 kilohms and 180 kilohms, respectively. The neon lamps 55 and 56 serve as voltage regulators to provide for a substantially constant voltage of approximately 150 volts to a potentiometer 59. The potentiometer 59, which may have a value of 1 megohm between end terminals, is controlled by the knob 16 at the front of the camera control unit 15 for adjusting the brightness of the Vidicon tube 25. The adjustable tap of the potentiometer 59 is coupled through a lead 19*b* of the cable 19 to the control grid of the Vidicon tube 25. The intensity of the beam, accordingly, through the tube 25 is determined by the adjustment of the potentiometer 59.

A secondary winding 40 of the transformer 32 is utilized to provide an alternating signal of 28 volts to a diode 51. The negative signal through the diode 51 is provided across two filter capacitors 44 and 45 each, illustratively, having a value of 1,500 microfarads. The 28 volt signal is provided through the cable 19 to the transistor circuitry in the television camera 10. A Zener diode 156 at the deflection chassis 350 in FIGURE 4 regulates the potential coupled to the transistor circuits shown in FIGURES 4 and 3 to 15 volt+5 percent. The Zener diode 156 is shunted by a series arrangement including the focus coil 158 of the tube 25 and a resistor 157. The resistor 158 may have a suitable value such as 18 ohms. A constant biasing potential is accordingly provided across the focus coil of the tube 25.

Figure 3:
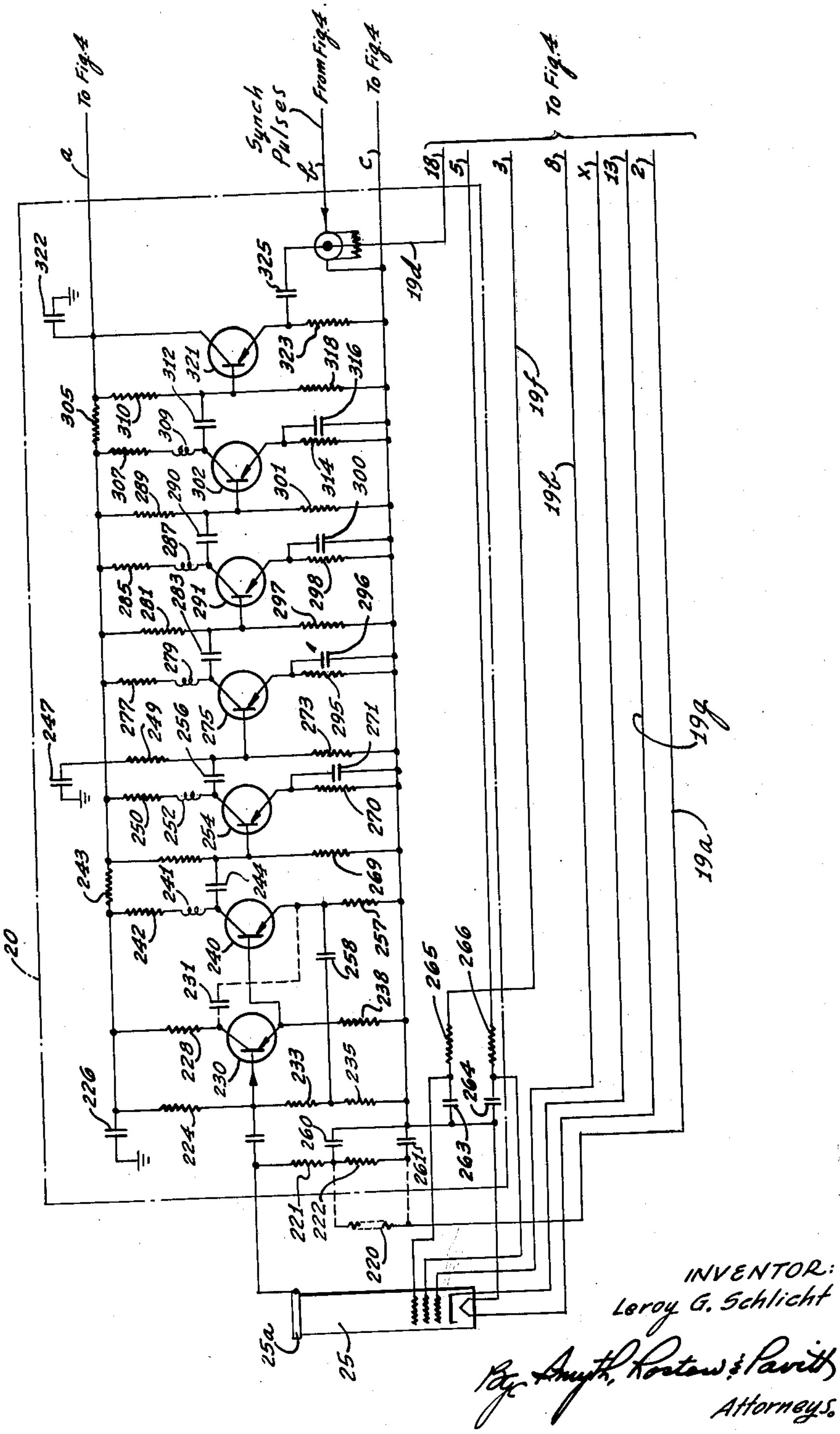
FIGURE 3 is a circuit representation of the video amplifier chassis of the television camera of this invention.

As described above, the potentiometer 50 adjusts the constrast provided by the Vidicon pick-up tube 25 in FIGURE 3. The Vidicon tube 25 contains a photosensitive target 25*a* for the electron beam. The sensitivity of the tube 25 depends, to a considerable extent, upon the potential at the target 25*a* with respect to the cathode potential. The potentiometer 50 in the control unit 15 performs this function by having its adjustable wiper arm connected to the target 25*a*, through the lead 19*a*, a resistor 222 and a resistor 221. The resistor 222 is a current limiting resistor and may have a suitable relatively high value of 1,000 megohms and the resistor 221 is a target load resistor and may have a suitable value such as 82 kilohms. Two capacitors 260 and 261 provide adequate decoupling for the target 25*a* of the tube 25.

The resistor 222 is extremely high in resistance to prevent rapid charging and discharging of the target 25*a* due to extreme changes in the light level provided to the target 25*a*. The resistor 222 limits the D.C. current to approximately 0.025 microamperes with +250 volts through lead 19*a*. In effect a D.C. constant current is provided. From the standpoint of the D.C. level the time constant of the arrangement is quite long. The video A.C. signals are not affected as they are coupled through the capacitor 223 to the transistor amplifier chain in the circuit 20. The resistor 222, in this manner, functions as an automatic light control to provide an adequate video image even in the presence of rapid and extreme changes in the light level. The use of this resistor 222 is dictated by the operating environment of the camera 10. If it is not needed, a resistor 220, shown in phantom, is connected in parallel with the resistor 222. The resistor 220 may have a value of 560 kilohms. When the automatic light control is desired, the resistor 220 is not utilized. A focus control potentiometer 72 in FIGURE 5 is provided to control the potential on the focus electrode of the Vidicon tube 25. This electrode is a long cylinder through which the electron beam passes and it functions in a manner similar to that of the electrostatic focusing element of a cathode ray tube. The potentiometer 72 is adjusted by the knob 18 at the front of the control unit 15. The potentiometer 72, which may be a 100 kilohm potentiometer is serially connected with a resistor 73 between the positive lead and ground. The resistor 73 may have a value of 150 kilohms. The adjustable tap of the focus control potentiometer 72 is connected through a lead 19*f* of cable 19 and a resistor 265 to the focus electrode of the tube 25. The resistor 265 may have a value of 100 kilohms. The focus electrode is coupled to ground by a capacitor 263 which may have a value of 0.05 microfarads.

In addition to the rectifying and filtering components in the control unit 15, the unit 15 also includes a multivibrator including a vacuum tube 60, an RF oscillator and modulator including a vacuum tube 62 and an isolation or impedance transformation circuit including a vacuum tube 64. All three of these arrangements are hereinafter described in detail. Before proceeding, however, with the description of these arrangements, the deflection circuit 350 in FIGURE 4 is first described.

The deflection circuit 350 serves to develop the vertical sweep and horizontal sweep signals for the Vidicon tube 25 in FIGURE 3. The vertical sweep signals are developed from the 60 cycle filament potential. The filament potential is provided to the filament of the Vidicon tube 25 and to the filaments of the three vacuum tubes 60, 62 and 64 in the control unit 15 from the secondary 42 of the transformer 32. The filament potential is also coupled through a lead 19*g* of the cable 19 to a rectifier 120 in the circuit 350. The rectifier 120 is poled to provide negative pulses at a repetition rate of 60 pulses per second across a load resistor 126. The resistor 126, which may have a value of 47 kilohms, develops a potential for triggering a blocking oscillator including a transistor 130 and a transformer 123 coupled in a regenerative arrangement.

Figure 6:
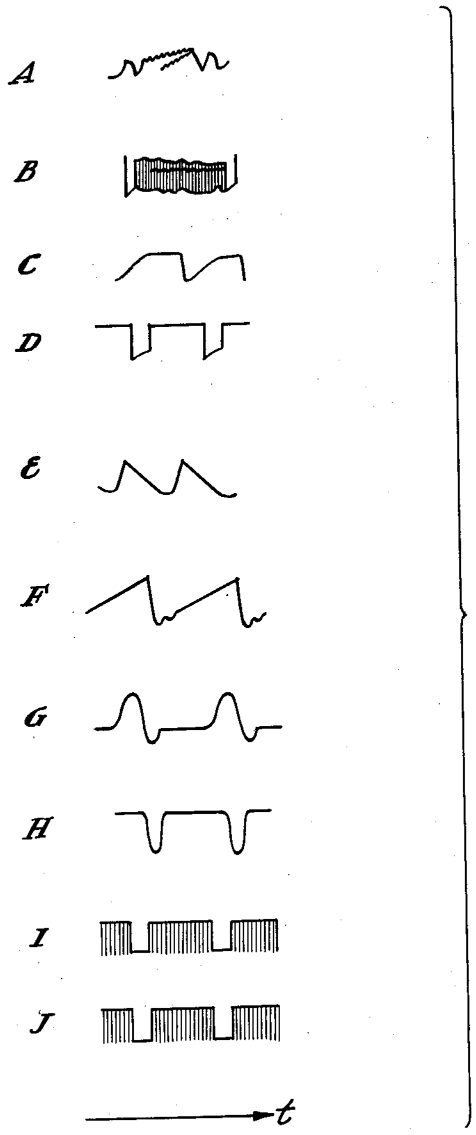
FIGURE 6 is a series of curves illustrating the operation of the deflection chassis of this invention.

The negative pulses across the load resistor 126, illustrated as curve C in FIGURE 6, are coupled through a capacitor 125 and the primary of the transformer 123 to the base electrode of the transistor 130. The base electrode is also coupled to a common junction by a resistor 127. The capacitor 125 may have a value of 0.1 microfarads, the resistor 127 may have a value of 3.3 kilohms and the transistor 310 may be a junction type PNP transistor 2N408. The emitter electrode of the transistor 130 is coupled through an emitter resistor 128 which may have a value of 15 kilohms to the common junction. The secondary of the transformer 123 is coupled between the collector electrode of the transistor 130 and the negative 15 volt potential lead, described above.

Each negative pulse introduced through the diode 120 triggers the blocking oscillator to develop a pulse having a shape depicted in curve D of FIGURE 6. The transistor 130 is driven into saturation by each input pulse with the resistor 122 and the inductance of the transformer 123 determining the pulse duration provided at the emitter electrode of the transistor 130. Illustratively, the time constant of these components may provide for a pulse between 1,000 and 1,500 microseconds in duration.

The negative pulses at the emitter electrode of the transistor 130 are coupled through a capacitor 135 to the base electrode of an amplifier transistor 132. The base electrode of the transistor 132 is coupled to the ground junction by a base resistor 137, and the emitter electrode of the transistor 132 is directly coupled to the common ground junction. The collector electrode of the transistor 132 is biased through a collector resistor 133. The capacitor 135 and resistors 137 and 133 may have suitable values such as 200 microfarads, 1.8 kilohms and 470 ohms respectively, and the transistor 132 may be a junction type PNP transistor 2N270. Relatively large pulses, of the type illustrated in curve E of FIGURE 6, are developed at the collector electrode of the transistor 132 responsive to the pulses from the blocking oscillator and these pulses are developed across two serially coupled capacitors 139 and 145. The approximate time constant of these capacitors together with the resistor 133 is 500 milliseconds with the capacitors 139 and 145 having suitable values such as 200 microfarads. The pulse repetition rate being only 108 milliseconds, only 20 percent of the saw tooth wave is developed across the capacitors 139 and 145. The capacitors 139 and 145 function as integrating means for developing the saw tooth wave depicted in curve *6e*. Since only a relatively small portion of the saw tooth wave is utilized, the linearity thereof is good.

The transistor 132 drives a transistor 148 through a coupling capacitor 140 which may have a value of 200 microfarads. The load driven by the transistor 132 is relatively small due to a positive feedback connection from the emitter electrode of the transistor 148 through a resistor 144, which may have a value of 150 ohms, to the junction of the capacitors 139 and 145. The positive feedback conection effectively decreases the impedance seen by the transistor 132 and, therefore, the time constant of the integrating arrangement to provide for improved linearity of the developed saw tooth wave.

The vertical size of the video image is controlled by a rheostat 154 which is coupled to the emitter electrode of the transistor 148. The rheostat 154 controls the current through the transistor 148 and, at the same time, the amount of feedback. The amount of feedback is reduced or increased in direction and by an amount dependent upon changes in the current through the transistor 148, thus maintaining the linearity throughout the entire range of control and eliminating the need of a separate linearity control. In prior arrangements, adjustments of the height of the video image varied the time constant so that a linearity control was required.

The current saw tooth signal at the collector electrode of the transistor 148 is developed across a collector resistor 149 and directly coupled to a vertical deflection coil or yoke 152 of the Vidicon tube 25 in FIGURE 3. The saw tooth deflection signal is shown as curve F in FIGURE 6. The coil 152 is shown in FIGURE 4 as part of the circuit 350 merely as a convenience to avoid the showing of lengthy leads from the collector electrode of the transistor 148 to the tube 25. The path through the coil 152 is returned through a capacitor 150 which may have a value of 200 microfarads to eliminate the flow of direct current in the deflection coil which would develop a magnetic field and offset the Vidicon beam.

The vertical deflection signal at the collector electrode of the transistor 148 is also capacitively coupled through a capacitor 163 having a value of 0.68 microfarad to the base electrode of a transistor 169. The transistor 169 is one of two paralleled transistors 169 and 170, which functions, as is hereinafter described, as a protecting and blanking arrangement for the Vidicon tube 25.

As indicated above, the horizontal deflection pulses are produced in the camera control unit 15 shown in FIGURE 5. The horizontal drive pulses are developed by the vacuum tube 60 which is connected in a multivibrator arrangement. The warm-up time of the vacuum tube 60 is approximately the same as the warm-up time of the Vidicon tube 25. The tube 60, accordingly, provides for a time delay to blank the electron beam in the Vidicon tube 25 until the horizontal deflection signals are being produced. The horizontal deflection signal, as is hereinafter described, is introduced to the protect and blanking circuit including the two paralleled transistors 169 and 170 briefly mentioned above.

The multivibrator, including the tube 60, is a conventional cathode coupled free running multivibrator having a frequency controlled by the time constant of a stabilization coil 80 and a capacitor 78 shunting the coil 80. The parallel arrangement of the inductor 80 and the capacitor 70 is coupled to an anode resistor 75 which may have a value of 5.8 kilohms. The capacitor 78 may have a value of 0.004 microfarad. Anode potential is provided from the filter consisting of the capacitors 46 and 48 and the resistor 47, described above. The grid of the left triode section of the tube 60 is coupled by a grid resistor 82 shunted by a capacitor 81 to the common ground junction, and the grid of the right triode section of the tube 60 is coupled by a resistor 86 to the common ground junction. The capacitor 81 may have a value of 0.003 microfarad and the resistors 82 and 86 may have respective values of 470 kilohms and 100 kilohms each. A common cathode resistor 83 is provided which may have a value of 2.2 kilohms. The anode of the left triode section is capacitively coupled to the grid of the right triode section by a capacitor 77 which may have a value of 1 microfarad. Anode potential is provided to the right triode section of the tube 60 by a resistor 79 which may have a value of 150 kilohms.

The pulses from the free running multivibrator including the tube 60 are coupled through a capacitor 85 to a step down transformer 87 and therefrom to a coaxial cable 19J which forms part of the cable 19 to the deflection circuit 350 in FIGURE 4. The capacitor 85 may have a value of 0.1 microfarad. At the circuit 350, the coaxial cable 19J terminates in a load resistor 184 which may have a value of 68 ohms. The pulses across the resistor 184 are shown in curve G of FIGURE 6 and are provided at a repetition rate of 15,750 pulses per second which is the horizontal line frequency of conventional video signals. The time base of the different curves in FIGURE 6 are different because the vertical deflection pulses at a frequency of 60 cycles per second whereas the horizontal pulses are at a frequency of 15,750 cycles per second. The pulses across the resistor 184 are coupled through a capacitor 185 to a class B type amplifier including a PNP junction transistor 188.

The transistor 188, which may be of the type 2N301, is based by a connection through a rheostat 173 and an adjustable inductor 178 coupled to its collector electrode and a resistor 174 coupled to its base electrode. Positive overshoot is clipped by a diode 187, shunted by a resistor 186, coupled between the base electrode and the common ground junction. The resistors 186 and 174 may have values of 820 ohms and 2.2 kilohms respectively, the capacitor 185 may have a value of 0.22 microfarads and the rheostat 173 may have a maximum resistance of 100 ohms.

The transistor 188 is driven to saturation to develop negative pulses at the collector electrode of the transistor 188 which are depicted in curve H of FIGURE 6 and which have an amplitude of approximately 60 volts. The inductor 178 in the collector circuit of the transistor 188 functions to develop the relatively large amplitude negative pulses. The negative, horizontal pulses are coupled through a capacitor 180 and a transformer 190 to the horizontal deflection coils 191 of the Vidicon tube 25. The transformer 190 provides D.C. isolation and impedance matching between the coils 191 and the class B amplifier including the transistor 188. The horizontal deflection coils 191 are connected in parallel to reduce the inductance of the windings by four times thus reducing the driving voltage requirements, and to facilitate the utilization of transistor circuitry.

In the event of a sweep failure of the Vidicon tube 25, it is desirable to turn off the electron beam in the tube 25 to prevent burning of the target *25a* by repetitive sweeps falling on the same place on the target *25a* for more than a few milliseconds. The transistors 169 and 170 described above, which form a protecting and blanking circuit arrangement, are utilized to turn off the Vidicon beam in the event of a sweep failure as well as to provide for the blanking of the beam between horizontal sweep signals. The transistors 169 and 170 have both emitter electrodes and collector electrodes coupled together. A positive potential of 45 volts regulated by a Zener diode 167 is provided to the emitter electrodes of the transistors 169 and 170. The Zener diode 167 may be a silicon diode 1N625 which functions to clip off positive pulses to protect the transistors from excessive biasing potential. The diode 167 also shunts the base-to-collector paths of the transistor 169 to compensate for leakage resistance.

Each of the transistors 169 and 170 is biased so that the absence of an input signal at its base electrode will cause saturating current flow. The emitter-to-base junction of the transistor 169 is forward biased because its base electrode is connected to ground by the resistor 165 whereas its emitter electrode is at +45 volts. Similarly, the emitter-to-base junction of the transistor 170 is forward-biased because its base electrode is connected to ground by the resistor 170. The resistor 165 may have a value of 1 megohm and the resistor 197 may have a value of 68 kilohms.

When either of the transistors is saturated, the full emitter potential appears across the serially connected collector resistors 214 and 215 and is applied to the cathode of the tube 25 through a lead X. The resistors 214 and 215 serve as the cathode resistors for the Vidicon tube 25 so that if neither sweep voltage is present, the cathode of the tube 25 is driven to +45 volts (the emitter potential) to cut off the Vidicon beam. The vertical and horizontal sweep potentials are applied respectively to the base electrodes of the transistors 169 and 170 with the respective transistors being driven to saturation during the sweep retrace time. The vertical sweep potential is provided from the transistor 148 through the coupling capacitor 163 to the base electrode of the transistor 169.

The horizontal sweep signals are provided from the transformer 190 through a diode 193 shunted by a capacitor 192 having a value of 0.005 microfarads. The negative pulses through the diode 193 are provided across a capacitor 195 and through a capacitor 194 to the base resistor 197. The capacitors 194 and 195 may have values of 0.05 microfarads and 0.005 microfarads respectively. If either one of the two transistors 169 and 170 is, accordingly, conductive due to a negative potential at its base electrode, current flows through its emitter-to-collector path and the collector resistors 214 and 215 to the common junction or ground connection. Collector bias is provided to the two transistors 169 and 170 from lead 19K through the cable 19, resistors 218 and 162 and a neon tube 161. The resistors 218 and 162 are serially connected with a resistor 160 to the ground junction. The resistors 218, 162 and 160 may have respective values of 47 kilohms, 1.2 megohms and 560 kilohms. The average collector voltage changes from approximately +45 volts to approximately 12.5 volts when either of the transistors 169 and 170 becomes conductive. The neon lamp 161 acts as a sweep indicator because it is energized as long as sweeps are present. Should a sweep failure occur, the lamp 161 extinguishes.

The positive potential developed across the resistor 215 is coupled through a capacitor 212 to an inverter arrangement including a transistor 210. The amplifier is driven to saturation to provide clean clipped pulses which are coupled to the output video line through an emitter follower including a transistor 200. These pulses, shown as curve J in FIGURE 6, serve as the composite synchronizing pulses for the television receiver or monitor, not shown. The emitter electrode of the transistor 210 is coupled to an emitter resistor 213 having a value of 150 ohms. The transistor is self-biased by a resistor 208 collected between its base and collector electrodes and also having a value of 150 ohms. Collector bias is provided through a resistor 206 which may have a value of 2.2 kilohms. The inverted positive pulses are coupled through a capacitor 204 having a value of 5 microfarads to the base electrode of the transistor 200. The transistor 200 is self-biased by a resistor 201 having a value of 150 kilohms and coupled between its base and collector electrodes. The transistor 200 does not invert the pulses coupled thereto, providing its output from its emitter to a resistor 202 which is selected to provide a potential of 0.5 to 1 volt peak-to-peak at the output cable of the 5 volt camera 10. The pulses are shown in curve J of FIGURE 6. As is hereinafter described, these synchronizing pulses are added to the video signal after it has been amplified by the circuit 20 shown in FIGURE 3.

As indicated above, if either of the transistors 169 and 170 is conductive, the beam in the pick-up tube 25 is blanked. These transistors are saturated during the respective horizontal and vertical flyback intervals. The potential at the multipled collector electrode is provided through a lead X to the cathode of the pick-up tube 25. The beam is accordingly blanked during the vertical and horizontal flyback intervals. The blanking pulses at the collector electrodes are depicted in curve I of FIGURE 6.

The target 25a of the Vidicon pick-up tube 25 provides a very high impedance output to the video amplifier circuit 20 illustrated in FIGURE 3. To present the necessary high impedance input a transistor 230 coupled to the target 25a of the tube 25 is connected in an emitter follower arrangement. The target 25a is coupled through a capacitor 223, which may have a value of 0.01 microfarads, to the base electrode of the transistor 230. The transistor 230, as well as 6 other transistors 240, 254, 275, 291, 302 and 321, which are included in the video amplifier circuit 20 may be PNP junction type transistors 2N1396. The collector electrode of the transistor 230 is biased from the —15 volt lead through resistors 305, 243 and 228 which effectively form a voltage divider arrangement. The values of the resistors 305, 243 and 228 may be respectively 220 ohms, 180 ohms and 1 kilohm. The junction of the resistors 243 and 228 is coupled to the common ground connection by a capacitor 226, the junction of the resistors 305 and 243 is coupled to the ground connection by a capacitor 247 and the other terminal of the resistor 305 is coupled to the ground connection by a capacitor 322. The capacitors 322, 247 and 226 may all be 500 cicrofarad capacitors. The potentials provided by this arrangement to the transistor circuitry is, accordingly, substantially direct current.

In addition to the utilization of the transistor 230 in an emitter follower arrangement, to further raise the amplifier input impedance, negative feedback is applied to the junction of two base bias resistors 233 and 235 which may have values respectively of 12 kilohms and 2.2 kilohms. The base electrode of the transistor 233 is biased by a serial circuit arrangement including a resistor 224 and the two resistors 233 and 234. The resistor 224 may have a suitable value such as 82 kilohms so that the emitter-to-base junction of the transistor 230 is forward biased by a relatively small potential. The output from the emitter follower including the transistor 230 is taken from across an emitter resistor 238 connected between the common connection or junction and the emitter electrode of the transistor 230. The output is coupled directly to the base electrode of a transistor 240 which provides the necessary phase inversion for the negative feedback to the junction of the base resistors 233 and 235. The feedback is provided from the emitter electrode of the transistor 240 through a coupling capacitor 258 which may have a value of 40 microfarads. The emitter electrode of the transistor 240 is coupled by an emitter resistor 257 to the common junction and its collector electrode if biased by a path through an inductor 241, a resistor 242 and the resistors 243 and 305. The inductor 241, which may have a value of 12 microhenries, functions to increase the response of the amplifier at the higher frequencies. The resistor 242 may have a value of 1 kilohm.

The negative feedback from the emitter of the transistor 240 serves a two-fold purpose by raising the input impedance of the second stage including the transistor 240 as well as in the input impedance of the first stage including the transistor 230. This large negative feedback also functions to improve the transient and frequency response of both stages.

A capacitor 231, illustratively of 40 microfarads, is shown in phantom coupled between the collector electrode of the transistor 230 and the emitter electrode of the transistor 240. The capacitor 240 serves as a bypass capacitor to couple the signal at the collector of the transistor 230 directly to the feedback path. The effect is cumulative to increase the feedback and accordingly the impedance presented by the two transistor stages. The cumulative effect of enhancing the impedance provides for good frequency response while permitting substantial variation of transistor characteristics. In addition to this transistor arrangement, as described above, the very large load resistor 222, mentioned above, is utilized at the output of the Vidicon pick up tube 25.

The video signal, illustrated in curve A of FIGURE 6, at the collector electrode of the transistor 240 is coupled to four substantially identical cascaded amplifier stages including the transistors 254, 275, 291 and 302, respectively. The stages are conventional video amplifiers having shunt peaking provided by an inductor which may have a value of 12 microhenries. The inductor 252 at the collector electrode of the transistor 254 is serially connected with a resistor 250 to the collector electrode of the transistor 254. The base electrode of the transistor 254 is biased by a circuit arrangement including two resistors 277 and 269. The resistors 277 and 269 may have values such as 10 kilohms and 330 ohms. The emitter electrode of the transistor 254 is connected to the common junction by an emitter resistor 270 shunted by a capacitor 271. The emitter resistor may have a value of 180 ohms and the capacitor may have a value of 150 microfarads. The emitter bypass capacitor 271 shapes the response of the amplifier stage by providing low frequency degeneration.

The output from the amplifier stage is provided from the collector electrode of the transistor 254 through a coupling capacitor 256 to the base electrode of the transistor 275 in the next stage. The capacitor 256 may have a value of 40 microfarads. The base electrode of the transistor 175 is biased over a path through the resistors 249 and 273 which may have values respectively of 23 kilohms and 2.2 kilohms. The succeeding stages, including respectively the transistors 275, 291 and 302, are identical except for the value of the bypass emitter capacitor. The bypass emitter capacitor 296 coupled to the emitter electrode of the transistor 275 is variable so that the frequency response may be increased or decreased. A capacitor 300 coupled to the emitter electrode of the transistor 291 may have a value of 0.0010 microfarad, and a capacitor 316 coupled to the emitter electrode of the transistor 302 may have a value of 150 microfarads.

Because transistor parameters may vary considerably and component tolerances may tend to be additive, the resistor 269, mentioned above, is selected for the amplifier chassis 20 to control the overall gain thereof. The resistor 269 may be a rheostat to facilitate the adjustment.

To supply the current necessary to drive a 72 ohm coaxial line, the amplifier stage including the transistor 302 is coupled to the coaxial line by an emitter follower stage including the transistor 321. The collector electrode of the transistor 302 is coupled by a capacitor 312 having a value of 40 microfarads to the base electrode of the transistor 321. The base electrode is biased over a path including two resistors 310 and 318 which may have values of 2.2 kilohms each. The collector electrode is directly coupled to the −15 volt lead and its emitter electrode is connected to the common junction by an emitter resistor 323 which may have a value of 820 ohms. The output from the emitter follower stage, illustrated by curve B in FIGURE 6, is coupled through a capacitor 325, which may have a value of 250 microfarads, through the coaxial line **19*d* to the control unit 15. At the unit 15, the video signal is introduced through a capacitor 107 to a vacuum tube cathode follower stage including the tube 64 mentioned above in the description of the control unit 15**. The cathode follower stage provides for an additional drive for the video output signals. It serves to isolate the transistor circuitry from the video receiver or monitor, not shown, at which the signals are provided.

The capacitor 107, which may have a value of 0.1 microfarad, is connected to the grid of the left triode section of the double triode 64. A grid leak resistor 108 is coupled from the grid to the ground connection and the cathode of the triode is coupled by a cathode resistor 109 to the ground connection. The resistors 108 and 109 may have values of 470 kilohms and 4.7 kilohms. A resistor 112 is serially connected with the resistor 109 and may have a value of 1.8 kilohms. The cathodes and anodes of the two triode sections of the tube 64 are also connected in common so that the effective arrangement is that of a single large triode. The video output is taken from the cathodes and provided to an output terminal 114. The anodes are biased over a path through a resistor 110, which may have a value of 2.5 kilohms, and the anodes are also shunted to ground by a capacitor 111, which may have a value of 20 microfarads.

In addition to the cathode follower stage, the video signals are also provided to an oscillator and modulator tube 62. The output terminal 114 is utilized when a television monitor, not shown, receives the television signals. When a conventional television receiver is to be utilized for receiving the television signals, the television signals must be suitably modulated on a carrier. The tube 62 is a pentode tube which develops the carrier signal and which modulates the television signals on the carrier. The cathode and control grid and screen grid of the pentode 62 form part of the oscillator and the anode, suppressor grid and screen grid form part of the modulator. The frequency of the carrier is determined by a tuned arrangement 97 which includes a capacitor 98 and a capacitor 99 shunted by an inductor 100. The capacitors 98 and 97 may have values of 22 micromicrofarads and 5.25 microfarads respectively, and the arrangement is coupled between the control and screen grids of the tube 62. Potential is provided to the tuned arrangement 97 from the junction of two anode resistors 91 and 92 through a resistor 93 and a resistor 101 to a tap on the inductor 100. The tap is capacitively coupled to ground by a capacitor 102. The resistors 91, 92, 93 and 101 may have values respectively of 82 kilohms, 1 kilohm, 47 kilohms and 10 ohms. The capacitor 102 and two capacitors 90 and 95 which respectively shunt the resistors 91 and 93 to ground may have values respectively of 0.001 microfarad, 40 microfarads and 40 microfarads.

The video signals through the coaxial cable **19*d* from the circuit 20 are introduced through a capacitor 105 to the suppressor grid of the tube 62. The opposite terminals of the capacitor 105, which may have a value of 0.47 microfarads, are coupled to ground through resistors 106 and 103. These resistors may have values respectively of 75 ohms and 15 kilohms. The modulated carrier is provided from the anode of the tube 62 through a capacitor 96 having a value of 0.001 microfarads to an output terminal 113. In the event a conventional television receiver is utilized for providing the video image, the output terminal 113 is, accordingly, utilized. The video signals to either of the output terminals 114 and 113 include the signals developed by the pick-up tube 25 as amplified by the transistor stages of the circuit 20 and also the synchronizing pulses as developed by the transistor circuitry of the deflection circuit 350 in FIGURE 4. As described above and illustrated in FIGURE 3, the synchronizing pulses from the deflection circuit 350 are multipled to the coaxial cable 19*d* with the video signals through the transistor amplifier circuit 20**.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a television camera, a pick-up tube for developing video signals, said pick-up tube having means for developing a beam of electrons and a light sensitive surface for receiving the beam, a D.C. biasing arrangement coupled to said light sensitive surface and including a resistance over 100 megohms for limiting the rate of change of D.C. current from said surface, a video amplifier, and means for capacitively coupling said amplifier to said surface, said video amplifier including a transistor emitter-follower stage connected by said coupling means to said surface, a transistor amplifier stage coupled to the output of said emitter-follow stage, and a negative feedback loop coupled from the output of said amplifier stage to the input of said emitter-follower stage whereby the effective impedance presented by both stages is increased.

2. In a television camera, a pick-up tube for developing video signals, said pick-up tube having means for developing a beam of electrons and a light sensitive surface for receiving the beam, a video amplifier, and means for capacitively coupling said amplifier to said surface, said video amplifier including a transistor emitter-follower stage connected by said coupling means to said surface, a transistor amplifier stage coupled to the output of said emitter-follow stage, and a negative feedback loop coupled from the output of said amplifier stage to the input of said emitter-follower stage whereby the effective impedance presented by both stages is increased.

3. In a television camera, a pick-up tube for developing video signals, said pick-up tube having means for developing a beam of electrons and a light sensitive surface for receiving the beam, means coupled to said tube for generating vertical and horizontal sweep signals and for introducing the generated signals to said tube for controlling the motion of the beam in said tube, and protection circuit means coupled to both said tube and said generating means for monitoring the generated signals and for blanking said tube when either the vertical or horizontal sweep signals are absent.

4. In a television camera in accordance with claim 3 wherein said protection circuit includes a first and a second transistor each having base, emitter and collector electrodes, means directly connecting said emitter electrodes to each other and said collector electrodes to each other, biasing means connected to the base, emitter and collector electrodes of both of said first and said second transistors for normally causing said first and said second transistors to be saturated, means connected to said generating means for introducing the horizontal sweep signal to the base electrode of said first transistor for inhibiting conduction in said first transistor and the vertical sweep signal to the base electrode of said second transistor for inhibiting conduction in said second transistor, and means coupled to said tube for introducing the potential of the collector electrodes of said first and said second transistors to said tube whereby said tube is blanked if either the vertical or horizontal sweep signals are absent.

5. In a television camera in accordance with claim 3 wherein said protection circuit includes means coupled to said tube for normally blanking said tube and means coupled to said blanking means and responsive to both the vertical and the horizontal sweep signals for operating said blanking means to unblank said tube.

6. In a television camera, a pick-up tube for developing video signals, said pick-up tube having means for developing a beam of electrons and a light sensitive surface for receiving the beam, a video amplifier, and means for capacitively coupling said amplifier to said surface, means coupled to said tube for generating vertical and horizontal sweep signals and for introducing the generated signals to said tube for controlling the motion of the beam in said tube, and protection circuit means coupled to both said tube and said generating means for monitoring the generated signals and for blanking said tube if either the vertical or horizontal sweep signals are absent, said protection circuit means including means for blanking said tube during the flyback portions of both the vertical and horizontal sweep signals from said generating means, and a synchronizing pulse amplifier coupled to said blanking means of said protection circuit means and to the output of said video amplifier for developing a synchronizing pulse each time said blanking means blanks the beam of said tube for addition to the amplified signals from said video amplifier.

7. In a television camera in accordance with claim 6 wherein said video amplifier includes a transistor emitter-follower stage connected by said coupling means to said surface, a transistor amplifier stage coupled to the output of said emitter-follow stage, and a negative feedback loop coupled from the output of said amplifier stage to the input of said emitter-follower stage whereby the effective impedance presented by both stages is increased.

8. In a television camera, a pick-up tube for developing video signals, said pick-up tube having means for developing a beam of electrons and a light sensitive surface for receiving the beam, means coupled to said tube for generating vertical and horizontal sweep signals and for introducing the generated signals to said tube for controlling the motion of the beam in said tube, said generating means including a source of alternating current, a saturating transistor amplifier coupled to said source for amplifying the alternating current, an integrating circuit coupled to said transistor amplifier and having a relatively long time constant compared to a cycle of the alternating current from said source, an adjustable transistor amplifier coupled to the output of said integrating circuit and to said tube for controlling the size of the image scanned by said tube, and a positive feedback circuit coupled from the output of said adjustable amplifier to the integrating circuit for maintaining the linearity of the signal developed by the integrating circuit with adjustments of the size of the image scanned by said tube at said adjustable amplifier.

9. In a television camera, a pick-up tube for developing video signals, said pick-up tube having means for developing a beam of electrons and a light sensitive surface for receiving the beam, means coupled to said tube for generating vertical and horizontal sweep signals and for introducing the generated signals to said tube for controlling the motion of the beam in said tube, said generating means including a source of alternating current, a saturating transistor amplifier coupled to said source for amplifying the alternating current, an integrating circuit coupled to said transistor amplifier and having a relatively long time constant compared to a cycle of the alternating current from said source, an adjustable transistor amplifier coupled to the output of said integrating circuit and to said tube for controlling the size of the image scanned by said tube, and a positive feedback circuit coupled from the output of said adjustable amplifier to the integrating circuit for maintaining the linearity of the signal developed by the integrating circuit with adjustments of the size of the image scanned by said tube at said adjustable amplifier, and a protection circuit coupled to both said tube and said generating means for monitoring the generated signals and for blanking said tube if either the vertical or horizontal sweep signals are absent.

10. In a television camera in accordance with claim 9 wherein said protection circuit includes a first and second transistor each having base, emitter and collector electrodes, means directly connecting said emitter electrodes to each other and said collector electrodes to each other, biasing means connected to the base, emitter and collector electrodes of both of said first and said second transistors for normally causing said first and said second transistors to be saturated, means connected to said generating means for introducing the horizontal sweep signal to the base electrode of said first transistor for inhibiting conduction in said first transistor and the vertical sweep signal to the base electrode of said second transistor for inhibiting conduction in said second transistor, and means coupled to said tube for introducing the potential of the collector electrodes of said first and said second transistors to said tube whereby said tube is blanked if either the vertical or horizontal sweep signals are absent.

11. In a television camera, a scanning tube for developing video signals, a D.C. biasing circuit coupled to the output of said tube for introducing a substantially constant current to delay the effect of a rapid change in the level of the light to said scanning tube, a video amplifier capacitively coupled to said scanning tube for receiving the developed video signals, means coupled to said tube for generating vertical and horizontal sweep signals and for introducing the generated signals to said tube for controlling the motion of the beam in said tube, and protection circuit means coupled to both said tube and said generating means for monitoring the generated signals and for blanking said tube when either the vertical or horizontal sweep signals are absent.

12. In a television camera, a scanning tube for developing video signals, a D.C. biasing circuit coupled to the output of said tube for introducing a substantially constant current to delay the effect of a rapid change in the level of the light to said scanning tube, and a video amplifier capacitively coupled to said scanning tube for receiving the developed video signals, said video amplifier including a transistor emitter-follower stage connected by said coupling means to said surface, a transistor amplifier stage coupled to the output of said emitter-follower stage, and a negative feedback loop coupled from the output of said amplifier stage to the input of said emitter-follower stage whereby the effective impedance presented by both stages is increased.

13. In a television camera, a pick-up tube for developing video signals, said pick-up tube having means for developing a beam of electrons and a light sensitive surface for receiving the beam, means coupled to said tube for generating vertical and horizontal sweep signals and for introducing the generated signals to said tube for controlling the motion of the beam in said tube, and a protection circuit coupled to both said tube and said generating means for monitoring the generated signals and for blanking said tube if either the vertical or horizontal sweep signals are absent, said generating means including a vacuum tube multivibrator having a warm up time which is approximately the same as the warm up time of said pick-up tube whereby said pick-up tube remains blanked until the sweep signals are generated.

14. In a television camera, a pick-up tube for developing video signals, said pick-up tube having means for developing a beam of electrons and a light sensitive surface for receiving the beam, a video amplifier, and means for capacitively coupling said amplifier to said surface, said video amplifier including a transistor emitter-follower stage connected by said coupling means to said surface, a transistor amplifier stage coupled to the output of said emitter-follower stage, and a negative feedback loop coupled from the output of said amplifier stage to the input of said emitter-follower stage whereby the effective impedance presented by both stages is increased, means coupled to said tube for generating vertical and horizontal sweep signals and for introducing the generated signals to said tube for controlling the motion of the beam in said tube, and protection circuit means coupled to both said tube and said generating means for monitoring the generated signals and for blanking said tube if either the vertical or horizontal sweep signals are absent, said generating means including a vacuum tube multivibrator having a warm up time which is approximately the same as the warm up time of said pick-up tube whereby said pick-up tube remains blanked until the sweep signals are generated.

References Cited in the file of this patent

UNITED STATES PATENTS

| | | |
|---|---|---|
| 2,141,343 | Campbell | Dec. 27, 1938 |
| 2,911,562 | Fathauer | Nov. 3, 1959 |

OTHER REFERENCES

Publication No. 1—"Miniature ITV Camera Uses Drift Transistors," Flory et al., Electronics, Jan. 1, 1957, pp. 138–142.

Publication No. 2—"Television System for Stratoscope I," Flory et al., Electronics, June 17, 1960, pp. 49–53.